(No Model.)

H. NISSON.
FENDER FOR FEED TROUGHS.

No. 424,020. Patented Mar. 25, 1890.

Witnesses,
Geo. H. Strong
J. H. Nourse

Inventor,
Hans Nisson
By Dewey & Co.
Attys

UNITED STATES PATENT OFFICE.

HANS NISSON, OF SACRAMENTO, CALIFORNIA.

FENDER FOR FEED-TROUGHS.

SPECIFICATION forming part of Letters Patent No. 424,020, dated March 25, 1890.

Application filed December 11, 1889. Serial No. 333,348. (No model.)

*To all whom it may concern:*

Be it known that I, HANS NISSON, a citizen of Germany, residing at Sacramento, Sacramento county, State of California, have invented an Improvement in Gates or Fenders for Feed-Troughs; and I hereby declare the following to be a full, clear, and exact description of the same.

My invention relates to the class of feed-troughs, and especially to those troughs which are provided with adjustable gates or fenders, the purpose of which is to prevent or allow access to the trough, as may be desired.

My invention consists in the novel gate or fender hereinafter fully described, and specifically pointed out in the claims.

The object of my invention is to provide a simple and effective device of this character.

Figure 1:
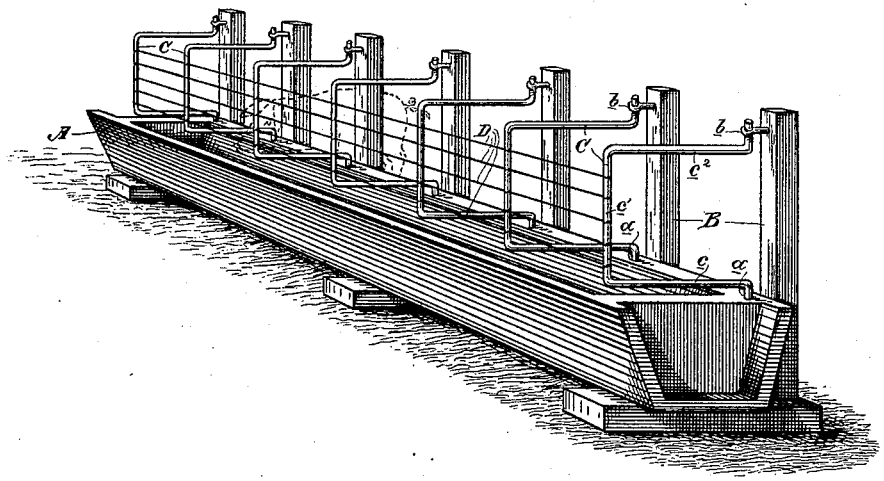
Figure 2:
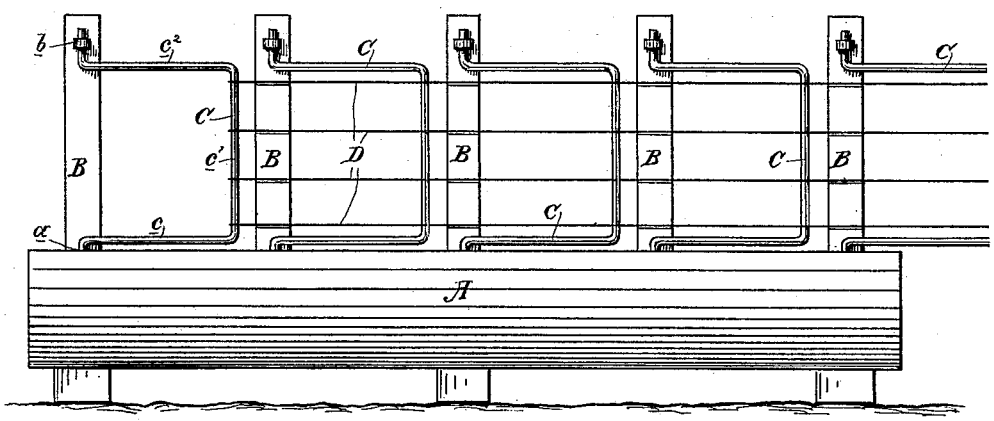

Referring to the accompanying drawings for a more complete explanation of my invention, Figure 1 is a perspective view of my gate or fender, showing it in an open position to permit access to the trough. Fig. 2 is a view showing the gate or fender in a closed position, thereby cutting off access to the trough.

A is the trough, of any suitable construction and dimensions and designed for the reception of food for animals.

B are posts, supports, or standards set at suitable intervals along the front of the trough.

C are bent brackets forming hinges, the lower ends of which are pivoted at $a$ in a suitable bearing below, and their upper ends are pivoted at $b$ to the posts B. These brackets are bent into what may be termed a "C" shape, having lower arm portions $c$, which are high enough to swing over the top of the trough and long enough to extend beyond its back edge, central portions $c'$, and upper arm portions $c^2$.

D are slats, rails, or wires, which extend horizontally and connect the central portions $c'$ of brackets C, thereby forming with said brackets a continuous gate or fender extending the whole length of the trough A.

The operation is as follows: When access is to be had to the trough, the connected brackets C are all turned so as to project backwardly over and at right angles to the trough, thereby, as shown in Fig. 1, carrying the rails D over to the back of the trough and extending them parallel with said trough and affording perfect access to it, as shown. In this movement the lower arm portions $c$ of the brackets swing over the top of the trough. When it be desired to cut off access to the trough, the brackets are turned back again to extend parallel and about in line with the series of posts B, so that the rails D form a perfect fender or guard, as shown in Fig. 2, along the front of the trough, and prevent the stock from getting at said trough.

Having thus described my invention, what I claim as new, and desire to secure by Letters Patent, is—

1. A gate or fender for feed-troughs, consisting of the series of swinging bent brackets along the front of the trough and adapted to be turned over its top and back again to its front edge, and the rails, slats, or wires connecting said brackets and adapted to extend along the back of the trough when the brackets are turned over its top and along in front of it when the brackets are turned back again, substantially as herein described.

2. A gate or fender for feed-troughs, consisting of the series of bent swinging brackets C, having horizontal lower arm portions $c$, adapted to be turned over the top of the trough and to extend to its back edge, and central portions $c'$, and the rails, slats, or wires D, connecting the central portions of the brackets, whereby when the brackets are turned over the trough said rails, slats, or wires extend along its back edge, and when turned back again they extend along its front, substantially as herein described.

3. A gate or fender for feed-troughs, consisting of the series of standards or supports B, ranged along the front of the trough, the hinge-brackets C, pivoted to said posts and adapted to swing, said brackets being bent so as to swing back and forth over the trough, and the rails, slats, or wires D, connecting the bent portions of said brackets, whereby when the brackets are turned over the trough said rails, slats, or wires extend along its back edge, and when turned forward again they extend along the front edge of the trough, substantially as herein described.

In witness whereof I have hereunto set my hand.

HANS NISSON.

Witnesses:
J. J. BUCKLEY,
R. R. PATTON.